United States Patent
Kuwahara

(10) Patent No.: US 12,331,228 B2
(45) Date of Patent: Jun. 17, 2025

(54) PHOTOCURABLE RESIN COMPOSITION, CURED PRODUCT, AND LAMINATED BODY

(71) Applicant: THREEBOND CO., LTD., Tokyo (JP)

(72) Inventor: Yusuke Kuwahara, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 81 days.

(21) Appl. No.: 17/507,211

(22) Filed: Oct. 21, 2021

(65) Prior Publication Data

US 2022/0145150 A1 May 12, 2022

(30) Foreign Application Priority Data

Nov. 10, 2020 (JP) .................................. 2020-187535

(51) Int. Cl.
  *C09J 175/14* (2006.01)
  *C08L 75/14* (2006.01)
  *C09J 7/30* (2018.01)

(52) U.S. Cl.
  CPC ............. *C09J 175/14* (2013.01); *C08L 75/14* (2013.01); *C09J 7/30* (2018.01); *C09J 2475/00* (2013.01)

(58) Field of Classification Search
  CPC ........ C09J 175/14; C09J 7/30; C09J 2475/00; C08L 75/14; C08L 33/20; B32B 27/08; B32B 2255/10; B32B 2255/26; B32B 2457/202; B32B 7/12; B32B 27/36; B32B 27/18; B32B 27/20; B32B 27/22; B32B 27/308; C08F 290/067; C08F 283/008; C08F 2/48; C08F 220/44; C08F 2/50; C08F 220/14; C08F 220/46; C08G 18/246; C08G 18/3206; C08G 18/61; C08G 18/755; C08G 18/673; C09D 175/16; C08K 3/26; C08K 3/36; C08K 9/08; C08K 9/12; C08K 2003/265
  USPC ...................................................... 428/423.1
  See application file for complete search history.

(56) References Cited

U.S. PATENT DOCUMENTS

| | | | | |
|---|---|---|---|---|
| 2005/0261392 | A1* | 11/2005 | Futami | C08G 18/4854 522/178 |
| 2006/0173121 | A1* | 8/2006 | Tamai | C08G 65/336 524/502 |
| 2007/0167583 | A1* | 7/2007 | Yano | C08J 3/24 525/100 |
| 2007/0224395 | A1* | 9/2007 | Rowitsch | C09J 147/00 428/323 |
| 2011/0178197 | A1* | 7/2011 | Clark | B01J 13/22 521/149 |
| 2015/0024218 | A1* | 1/2015 | Koga | C09J 175/16 428/423.1 |
| 2015/0165743 | A1* | 6/2015 | Horigome | B32B 37/12 428/354 |
| 2018/0258331 | A1* | 9/2018 | Huh | C09J 11/08 |
| 2019/0194415 | A1* | 6/2019 | Tayagaki | B01J 13/18 |
| 2019/0194443 | A1* | 6/2019 | Ota | C09J 151/08 |
| 2021/0363320 | A1* | 11/2021 | Tayagaki | C08J 9/232 |

FOREIGN PATENT DOCUMENTS

| | | |
|---|---|---|
| JP | 2008-235170 A | 10/2008 |
| JP | 2008291166 A | 12/2008 |
| JP | 2015189851 A | 11/2015 |
| JP | 2016108486 A * | 6/2016 |
| JP | 2016199668 A | 12/2016 |
| WO | WO-2020149379 A1 * | 7/2020 |

OTHER PUBLICATIONS

Machine translation of JP 2016-108486 A (Year: 2016).*
Sigma Aldrich, "Di(trimethylolpropane) tetraacrylate", Aug. 10, 2022, p. 1 (Year: 2022).*
Machine translation of WO 2020/149379 A1 (Year: 2020).*
IPO, Letter and Examination Report under Section 18(3), issued on Apr. 29, 2024 for the corresponding United Kingdom Patent Application No. 2114326.8, 4 pages.
Office Action, mailed on May 15, 2025, issued for the corresponding Chinese Patent Application No. 202111220595.8, 28 pages, with English translation.

* cited by examiner

*Primary Examiner* — Callie E Shosho
*Assistant Examiner* — Steven A Rice
(74) *Attorney, Agent, or Firm* — LUCAS & MERCANTI, LLP

(57) ABSTRACT

The photocurable resin composition of the present invention has a reaction force at 10% compression of a cured product of the photocurable resin composition of 1 to 300 kPa and a reaction force at 50% compression of the cured product of the photocurable resin composition of 1 to 500 kPa, contains a hollow organic resin filler as a component (A), and does not contain a monofunctional acrylic monomer having a hydroxyl group.

18 Claims, No Drawings

PHOTOCURABLE RESIN COMPOSITION, CURED PRODUCT, AND LAMINATED BODY

CROSS-REFERENCE TO RELATED APPLICATION

The present application is based on Japanese Patent Application No. 2020-187535 filed on Nov. 10, 2020, the disclosure content of which is incorporated herein by reference in its entirety.

BACKGROUND

1. Technical Field

The present invention relates to a photocurable resin composition, a cured product, and a laminated body.

2. Description of Related Arts

In recent years, laminate type lithium ion secondary batteries have been widely used as power sources for portable devices such as multifunctional mobile phones and digital cameras for the purpose of downsizing and weight reduction.

JP 2008-235170 A discloses a laminate type lithium ion secondary battery in which battery cells are fixed so as not to move by applying a certain load or more in the laminated direction from the viewpoint of long-term reliability.

JP 2008-235170 A discloses, as a structure of the laminate type lithium ion secondary battery, a configuration in which a cushioning material and the like are sandwiched between the battery cells such that a surface pressure is uniformly generated. However, in the case of using a conventional cushioning material, when the compressibility is too high, there has been a problem that the surface of the case of a battery pack deforms due to reaction force generated in the cushioning material or expansion of the battery cell itself.

The present invention has been made in view of the above circumstances, and an object of the present invention is to provide a photocurable resin composition from which a cured product having a low reaction force in a wide range of compressibility (compression range) can be obtained. Another object of the present invention is to provide a cured product obtained by curing the photocurable resin composition. Still another object of the present invention is to provide a laminated body obtained by bonding adherends using the cured product.

SUMMARY

As a result of intensive studies to solve the above problems, the inventor of the present invention has found that a cured product having a low reaction force in a wide range of compressibility (compression range) can be obtained according to a photocurable resin composition described in detail below, and has completed the present invention.

To achieve at least one of the abovementioned objects, a photocurable resin composition according to one aspect of the present invention is a photocurable resin composition wherein a reaction force at 10% compression of a cured product of 1 to 300 kPa and a reaction force at 50% compression of the cured product of 1 to 500 kPa, and wherein the photocurable resin composition contains a hollow organic resin filler as a component (A), and does not contain a monofunctional (meth)acrylic monomer having a hydroxyl group.

In addition, to achieve at least one of the abovementioned objects, a photocurable resin composition according to another aspect of the present invention contains a hollow organic resin filler as a component (A) and does not contain a monofunctional (meth)acrylic monomer having a hydroxyl group, and a cured product of the photocurable resin composition has a reaction force at 10% compression of 1 to 300 kPa and a reaction force at 50% compression of 1 to 500 kPa.

DETAILED DESCRIPTION

Hereinafter, embodiments of the present invention will be described. Note that the present disclosure is not limited only to the following embodiments. In the present specification, "X to Y" means a range including numerical values (X and Y) described before and after "to" as a lower limit value and an upper limit value, and means "X or more and Y or less". A concentration and % represent a mass concentration and mass %, respectively, unless otherwise specified, and a ratio is a mass ratio unless otherwise specified. Unless otherwise specified, operations and measurements of physical properties and the like are performed under the conditions of room temperature (20 to 25° C.)/relative humidity 40 to 5% RH. Also, "A and/or B" means that each of A and B, and a combination thereof are included.

Photocurable Resin Composition

A photocurable resin composition (hereinafter, also referred to as "photocurable resin composition" or simply "resin composition") according to one aspect of the present invention has a reaction force at 10% compression of a cured product of 1 to 300 kPa and a reaction force at 50% compression of the cured product of 1 to 500 kPa, contains a hollow organic resin filler as a component (A), and does not contain a monofunctional (meth)acrylic monomer having a hydroxyl group.

According to the photocurable resin composition according to one aspect of the present invention, a cured product having a low reaction force in a wide range of compressibility can be obtained. That is, when a cured product obtained by using the photocurable resin composition is compressed in a wide range of compressibility, the reaction force generated in the cured product can be reduced. Specifically, the cured product obtained by using the photocurable resin composition has a reaction force of 1 to 300 kPa at 10% compression and a reaction force of 1 to 500 kPa at 50% compression.

As described above, according to the photocurable resin composition according to the present invention, when a cured product is compressed in a wide range of compressibility, a reaction force generated in the cured product is small. Although details of this mechanism are unknown, it is considered that because the hollow organic resin filler contained as the component (A) is soft as compared with for example a glass filler or the like and plays a role as a cushioning material by being a hollow body, a reaction force generated when the cured product is compressed (in particular, when compression is performed at a high compressibility) becomes small. When a monofunctional (meth)acrylic monomer having a hydroxyl group is contained, photocurability deteriorates, and a good cured product can not be obtained (see Comparative Examples 3 and 4 described later), the detailed mechanism of which is unknown.

Note that the above mechanism is based on presumption, and correctness or incorrectness of the mechanism does not affect the technical scope of the present invention.

The photocurable resin composition according to a preferred embodiment of the present invention further contains the following components (B) to (D);
component (B): a monofunctional urethane (meth)acrylate
component (C): a monofunctional (meth)acrylic monomer other than the component (B), and
component (D): a photo-radical polymerization initiator.

The photocurable resin composition according to a preferred embodiment of the present invention further contains a plasticizer having no (meth)acryloyl group as the component (E).

Furthermore, the photocurable resin composition according to a preferred embodiment of the present invention further contains a bifunctional or higher polyfunctional (meth)acrylic monomer as a component (F).

Hereinafter, the components contained in the photocurable resin composition according to one aspect of the present invention will be described.

<Monofunctional (Meth)acrylic Monomer Having Hydroxyl Group>

The photocurable resin composition according to the present invention does not contain a monofunctional (meth) acrylic monomer having a hydroxyl group. With such a configuration, the photocurability of the photocurable resin composition can be improved. When the photocurable resin composition contains a monofunctional (meth)acrylic monomer having a hydroxyl group, photocuring does not sufficiently proceed, which is not practical (see Comparative Examples 3 and 4 described later).

The absence of the monofunctional (meth)acrylic monomer having a hydroxyl group in the composition may be determined by using $^1$H NMR and $^{13}$C NMR.

In the present specification, "not containing (does not contain)" or "not including (does not include)" a certain component means "substantially not containing" the component, and includes an aspect in which a target substance is contained by contamination. Specifically, it means that the target substance may be present at a ratio of 0.1 mass % or less (lower limit: 0 mass %) relative to the total mass of the composition.

In the present specification, "(meth)acrylic monomer" refers to a monomer having one or more (meth)acryloyl groups. The term "(meth)acryloyl" encompasses both acryloyl and methacryloyl. Thus, for example, the term "(meth)acryloyl group" encompasses both acryloyl groups ($H_2C=CH-C(=O)-$) and methacryloyl groups ($H_2C=C(CH_3)-C(=O)-$). Likewise, the term "(meth)acrylate" encompasses both acrylate and methacrylate, and the term "(meth)acrylic" encompasses both acrylic and methacrylic.

The "monofunctional (meth)acrylic monomer having a hydroxyl group" is a monomer having one or more hydroxyl groups and having one acryloyl group or one methacryloyl group. Examples of such a monomer include 2-hydroxyethyl (meth)acrylate or the like.

<Component (A)>

The component (A) contained in the photocurable resin composition is a hollow resin filler (hollow organic resin filler). The hollow resin filler is a hollow body having a hollow portion, and refers to particles formed of a resin. By containing such a component (A), a cured product obtained by curing the photocurable resin composition according to the present invention has a small reaction force generated even when compressed in a wide range of compressibility (in particular, at a high compressibility). By combining the component (A) with other components (preferably, the components (B) to (F)) described below, not only a cured product that generates a small reaction force as described above can be obtained, but also the photocurable resin composition can be quickly cured by photocuring.

The shape of the hollow resin filler is not particularly limited, and may be any shape such as a spherical shape, a needle shape, a fiber shape, or a plate shape, but the hollow resin filler is preferably a spherical shape from the viewpoint of not only reducing the reaction force at the time of compression of the cured product but also easily dispersing the filler uniformly in the resin composition. Here, "spherical" means a shape having an aspect ratio of 1.0 to 2.0, preferably 1.0 to 1.5, and does not necessarily mean a true sphere. The aspect ratio in the case of a spherical filler means a major (long) diameter/minor (short) diameter ratio.

The average particle diameter of the hollow resin filler as the component (A) is not particularly limited, and is preferably 5 to 300 μm, more preferably 10 to 200 μm, still more preferably 50 to 150 μm, particularly preferably 60 to 130 μm, and most preferably 70 to 100 μm. The average particle diameter of the component (A) may be determined by a particle size distribution meter using an analysis means such as a laser light diffraction method. By having the average particle size of the component (A) within the above range, a cured product having a low reaction force in an even wider range of compressibility (compression range) can be obtained.

The component (A) is formed of a resin (organic resin). The resin constituting the component (A) is not particularly limited, and is preferably a thermoplastic resin, and more preferably a polymer (homopolymer) of at least one monomer selected from the group consisting of vinylidene chloride, acrylonitrile, methacrylonitrile, acrylic acid ester (acrylate), and methacrylic acid ester (methacrylate), or a copolymer of two or more monomers selected from the above. These resins may be used singly or in combination of two or more kinds thereof. From the viewpoint of toughness (strength) of the hollow resin filler, the resin constituting the hollow resin filler is preferably a polymer (polyacrylonitrile resin) or copolymer containing acrylonitrile as a constituent unit, more preferably a copolymer containing acrylonitrile as a constituent unit, and particularly preferably an acrylonitrile-methacrylonitrile-methyl methacrylate copolymer. That is, the hollow resin filler is preferably comprised of an acrylonitrile-methacrylonitrile-methyl methacrylate copolymer.

The hollow resin filler as the component (A) is preferably surface-treated because it becomes easily compatible with other components such as the components (B) to (F) described below. The type of surface treatment is not particularly limited, and the hollow resin filler may be surface-treated with a silane coupling agent, a fatty acid, or the like, or calcium carbonate may be adhered to the surface thereof. Among them, the component (A) is more preferably a hollow resin filler in which calcium carbonate is adhered to its surface. These types of surface treatment may be used singly or in combination.

The true specific gravity of the component (A) is not particularly limited, and is, for example, preferably 0.03 to 0.50 g/cm$^3$, more preferably 0.05 to 0.40 g/cm$^3$, and particularly preferably 0.07 to 0.30 g/cm$^3$. The true specific gravity of the component (A) is determined in accordance with JIS Z 8807:2012. By having the true specific gravity of the component (A) within the above range, a cured product having a low reaction force in an even wider range of compressibility (compression range) can be obtained.

The content of the component (A) is not particularly limited, and is preferably 3 to 80 parts by mass, more preferably 5 to 50 parts by mass, particularly preferably 8 to 30 parts by mass, and most preferably 10 to 20 parts by mass relative to 100 parts by mass of the total mass of the photocurable resin composition.

The content of the component (A) is not particularly limited, and is, for example, preferably 3 to 70 parts by mass, more preferably 5 to 60 parts by mass, particularly preferably 10 to 50 parts by mass, and most preferably 20 to 30 parts by mass relative to 100 parts by mass of a total of the component (B) and the component (C) described below.

As the hollow resin filler as the component (A), either a synthetic product or commercially available product may be used. Examples of a commercially available product of the component (A) include EMC-40B, EMC-80B, EMC-120α (manufactured by Nippon Fillite Co., Ltd.), and the like.

One kind of the hollow resin filler as the component (A) may be used singly, or two or more kinds thereof may be used in combination. When two or more kinds are used in combination, the content of the component (A) refers to the total amount.

<Component (B)>

The photocurable resin composition according to the present invention preferably contains a monofunctional urethane (meth)acrylate as a component (B). By combining the component (B) with the component (A), the reaction force not generated in the cured product can be made smaller even when the cured product is compressed in a wide range of compressibility (compression range).

Here, the urethane (meth)acrylate is an ester compound having a urethane bond formed by reacting an isocyanate group with a hydroxy group, and a (meth)acryloyl group. That is, the urethane (meth)acrylate is a (meth)acrylic acid ester having a urethane bond. In the monofunctional urethane (meth)acrylate as the component (B), the number of urethane bonds may be one or more in one molecule, and the number of (meth)acryloyl groups is one in one molecule. The (meth)acryloyl group may be contained in the compound as a form of a (meth)acryloyloxy group. When the urethane (meth)acrylate having two or more (meth)acryloyl groups is used, the reaction force of the cured product of the photocurable resin composition becomes high, which is not preferable. In addition, from the viewpoint that the compression set of the resulting cured product becomes small, the (meth)acryloyl group contained in the component (B) is preferably an acryloyl group. Here, "the compression set is small" in a certain material means that a restoring force is high when the material is compressed for a long time. Such a property is important, for example when the photocurable resin composition according to the present invention (and a cured product thereof) is used as a cushioning material used in the laminate type lithium ion secondary battery as described above. Because an acryloyl group has a higher reaction rate than a methacryloyl group, it is considered that when the (meth)acryloyl group contained in the component (B) is an acryloyl group, the compression set becomes small as described above.

The monofunctional urethane (meth)acrylate as the component (B) is preferably a monofunctional urethane (meth) acrylate oligomer in order to improve desired effects. In the present specification, "oligomer" refers to a polymer in which monomer units (including monomer units other than (meth)acrylate monomers) are repeated about 2 to several tens of times, the polymer having a weight average molecular weight of 1,000 g/mol or more.

The monofunctional urethane (meth)acrylate as the component (B) may contain a structure other than a urethane bond and a (meth)acryloyl group, and may contain, for example, a polyester skeleton, a polycaprolactone skeleton, a polycarbonate skeleton, a polyether skeleton, or the like. One kind of these skeletons may be contained in one molecule, or two or more kinds thereof may be contained in combination. Among them, from the viewpoint of further improving desired effects, the component (B) preferably has a polyether skeleton. In the present specification, "polyether skeleton" means a skeleton having an alkylene oxide such as polyethylene oxide, polypropylene oxide, or polybutylene oxide as a repeating unit.

From the viewpoint of further improving desired effects, the component (B) is preferably a monofunctional urethane (meth)acrylate oligomer having a polyether skeleton (polyether-based monofunctional urethane (meth)acrylate oligomer), and more preferably a monofunctional urethane acrylate oligomer having a polyether skeleton.

On the other hand, the component (B) is preferably a monofunctional urethane (meth)acrylate having no hydroxyl group from the viewpoint of photocurability.

As the monofunctional urethane (meth)acrylate (monofunctional urethane (meth)acrylate oligomer) as the component (B), either a synthetic product or a commercially available product may be used.

The method for producing the component (B) is not particularly limited, and examples thereof include a method in which a polyol compound having a hydroxyl group is reacted with a (meth)acrylate having an isocyanate group, and a method in which a polyol compound having a hydroxyl group, a polyisocyanate compound, a (meth)acrylate having a hydroxyl group are reacted, and the like. These reactions are preferably carried out in the presence of a catalyst.

The polyol compound having a hydroxyl group is not particularly limited, and examples thereof include polyester polyols; polycarbonate polyols; polyether polyols such as polyethylene oxide, polypropylene oxide, and polybutylene glycol, and the like. The number of repeating units of the alkylene oxide contained in the polyether polyol is not particularly limited, and is, for example, 3 to 500, more preferably 5 to 100, and particularly preferably 10 to 50.

The (meth)acrylate having an isocyanate group is not particularly limited, and examples thereof include 2-isocyanatoethyl (meth)acrylate, 2-(2-(meth)acryloyloxyethyloxy) ethyl isocyanate, and the like.

The polyisocyanate compound is not particularly limited, and examples thereof include aromatic polyisocyanates such as 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, naphthalene-1,5-disocyanate, and triphenylmethane triisocyanate; alicyclic polyisocyanates such as isophorone diisocyanate, bis(4-isocyanatocyclohexyl)methane, 1,3-bis (isocyanatomethyl)cyclohexane, 1,4-bis(isocyanatomethyl) cyclohexane, norbornane diisocyanate, and bicycloheptane triisocyanate; linear or branched aliphatic polyisocyanates such as hexamethylene diisocyanate, 1,3,6-hexamethylene triisocyanate, 1,6,11-undecatriisocyanate, and the like. Among them, from the viewpoint of obtaining a cured product having flexibility, the polyisocyanate compound is preferably at least one selected from linear or branched aliphatic polyisocyanates and alicyclic polyisocyanates. These may be used singly, or two or more of them may be used in combination.

The (meth)acrylate having a hydroxyl group is not particularly limited, and examples thereof include 2-hydroxyethyl (meth)acrylate, 2-hydroxypropyl (meth)acrylate, 2-hydroxybutyl (meth)acrylate, 4-hydroxycyclohexyl (meth)acrylate, 1,6-hexanediol mono(meth)acrylate, neopentyl glycol mono(meth)acrylate, (poly)ethylene glycol mono(meth)acrylate, (poly)propylene glycol mono(meth)acrylate, pentaerythritol tri(meth)acrylate, and the like. Among them, 2-hydroxyethyl (meth)acrylate, 2-hydroxypropyl (meth)acrylate, 2-hydroxybutyl (meth)acrylate, and 4-hydroxycyclohexyl (meth)acrylate are preferable from the viewpoint of obtaining a cured product having excellent flexibility. These may be used singly, or two or more of them may be used in combination.

Examples of the catalyst used in the synthesis of the component (B) include lead oleate, antimony trichloride, triphenylaluminum, trioctylaluminum, tetrabutyltin, dibutyltin dilaurate, copper naphthenate, zinc naphthenate, zinc octylate, zinc octenate, zirconium naphthenate, cobalt naphthenate, tetra-n-butyl-1,3-diacetyloxydistannoxane, triethylamine, 1,4-diaza[2,2,2]bicyclooctane, N-ethylmorpholine, and the like. Among them, dibutyltin dilaurate, zinc naphthenate, zinc octylate, and zinc octenate are preferably used because a photocurable resin composition cures quickly even when the integrated light amount of irradiation light is small and a cured product having low elasticity can be obtained. The addition amount of these catalysts is preferably 0.0001 to 10 parts by mass relative to 100 parts by mass of the total mass of the reactants. The reaction temperature is usually 10 to 100° C., and particularly preferably 30 to 90° C.

The weight average molecular weight of the component (B) is not particularly limited. The weight average molecular weight of the component (B) is, for example, preferably 1,000 to 300,000 g/mol (1,000 or more and 300,000 or less), more preferably 3,000 to 50,000 g/mol (3,000 or more and 50,000 or less), and particularly preferably 5,000 to 40,000 g/mol (5,000 or more and 40,000 or less) because a cured product can be quickly obtained by photocuring and a cured product having a low reaction force in a wide range of compressibility (compression range) can be obtained. In the present specification, unless otherwise specified, a value calculated by a standard polystyrene conversion method using size exclusion chromatography (SEC) is adopted as the weight average molecular weight.

The content of the component (B) is not particularly limited, and is preferably 20 to 90 parts by mass, more preferably 30 to 85 parts by mass, still more preferably 40 to 80 parts by mass, particularly preferably in the range of 50 to 75 parts by mass, and most preferably in the range of 60 to 70 parts by mass relative to 100 parts by mass of a total of the component (B) and the component (C) described later. By having the content of the component (B) within the above range, it is possible to obtain a photocurable resin composition from which a cured product can be obtained more quickly by photocuring, and a cured product having a low reaction force in a wide range of compressibility (compression range) can be obtained.

One kind of the monofunctional urethane (meth)acrylate as the component (B) may be used singly, or two or more kinds thereof may be used in combination. When two or more kinds are used in combination, the content of the component (B) refers to the total amount.

<Component (C)>

The photocurable resin composition according to the present invention preferably contains a monofunctional (meth)acrylic monomer other than the component (B) as a component (C). By combining the component (C) with the component (A), a cured product can be quickly obtained by photocuring, and a cured product having a low reaction force in a wide range of compressibility (compression range) can be obtained.

Here, the monofunctional (meth)acrylic monomer is a compound having one (meth)acryloyl group. The (meth)acryloyl group may be contained in the monomer as a form of a (meth)acryloyloxy group. Note that a compound (however, an ester compound) having one or more urethane bonds and one (meth)acryloyl group in one molecule is contained in the component (B) and is not contained in the component (C).

In addition, for the purpose of improving photocurability, the (meth)acryloyl group contained in the component (C) is preferably an acryloyl group. With such a configuration, them is also an advantage that the reaction rate becomes high and the compression set of the resulting cured product becomes small.

The monofunctional (meth)acrylic monomer as the component (C) is preferably a monofunctional (meth)acrylate monomer (that is, an ester compound having one (meth)acryloyloxy group, a (meth)acrylic acid ester) in order to improve desired effects.

The component (C) may contain a structure other than the (meth)acryloyl group. As such a structure, from the viewpoint of further improving desired effects, the component (C) preferably has a polyether skeleton. The definition of "polyether skeleton" is as described in the section of the component (B). The number of repeating units of the alkylene oxide constituting the polyether skeleton is not particularly limited, and is, for example, 2 to 300, preferably 2 to 100, more preferably 2 to 30, and particularly preferably 2 to 10. The number of carbon atoms constituting the alkylene oxide is not particularly limited, and the number of carbon atoms in one repeating unit is preferably 2 to 10, more preferably 2 to 5, particularly preferably 2 to 4, and most preferably 2. That is, the polyether skeleton contained in the component (C) is preferably a polyethylene oxide skeleton.

The molecular weight of the component (C) is not particularly limited, and is preferably less than 1000 g/mol, more preferably 500 g/mol or less, and particularly preferably 300 g/mol or less from the viewpoint of improving the curability of the photocurable resin composition. From the viewpoint of being excellent in compatibility with the component (B), the molecular weight of the compound of the component (C) is preferably 100 g/mol or more, and more preferably 130 g/mol or more. In the present specification, the molecular weight of the compound (low molecular weight compound) may be measured by a known method such as a gas chromatography-mass spectrometry (GC-MS) method. When the measurement cannot be performed by the method, the molecular weight may be specified by specifying the structure of the compound by a method such as NMR and performing calculation based on the compound structure.

On the other hand, from the viewpoint of photocurability, the component (C) is preferably a monofunctional (meth)acrylic monomer having no hydroxyl group, more preferably a monofunctional (meth)acrylate monomer having no hydroxyl group, and particularly preferably a monofunctional acrylate monomer having no hydroxyl group.

The component (C) is not particularly limited, and is, for example, methoxydiethylene glycol mono(meth)acrylate, methoxytriethylene glycol mono(meth)acrylate, methoxytetraethylene glycol mono(meth)acrylate, and methoxypentaethylene glycol mono(meth)acrylate, methoxyhexaethylene glycol mono(meth)acrylate, methoxyheptaethylene glycol mono(meth)acrylate, methoxyhectaethylene glycol mono(meth)acrylate, methoxyoctaethylene glycol mono(meth)acrylate, methoxynonaethylene glycol mono(meth)acrylate, methoxydecaethylene glycol mono(meth)acrylate, methoxytripropylene glycol mono(meth)acrylate, methoxytetrapropylene glycol mono(meth)acrylate, methoxypentapropylene glycol mono(meth)acrylate, methoxyhexapropylene glycol mono(meth)acrylate, methoxyheptapropylene glycol mono(meth)acrylate, methoxyhectapropylene glycol mono(meth)acrylate, methoxyoctapropylene glycol mono(meth)acrylate, methoxynonapropylene glycol mono(meth)acrylate, methoxydecapropylene glycol mono(meth)acrylate, methoxytributylene glycol mono(meth)acrylate, methoxytetrabutylene glycol mono(meth)acrylate, methoxypentabutylene glycol mono(meth)acrylate, methoxyhexabutylene glycol mono(meth)acrylate, methoxyheptabutylene glycol mono(meth)acrylate, methoxyhectabutylene glycol mono(meth)acrylate, methoxyoctabutylene glycol mono(meth)acrylate, methoxynonabutylene glycol mono(meth)acrylate, methoxydecabutylene glycol mono(meth)acrylate, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxyhectaethylene glycol mono(meth)acrylate, ethoxyoctaethylene glycol mono(meth)acrylate, ethoxynonaethylene glycol mono(meth)acrylate, ethoxydecaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxyhectapropylene glycol mono(meth)acrylate, ethoxyoctapropylene glycol mono(meth)acrylate, ethoxynona propylene glycol mono(meth)acrylate, ethoxydecapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, ethoxyheptabutylene glycol mono(meth)acrylate, ethoxyhectabutylene glycol mono(meth)acrylate, ethoxyoctabutylene glycol mono(meth)acrylate, ethoxynonabutylene glycol mono(meth)acrylate, and ethoxydecabutylene glycol mono(meth)acrylate, and the like. Among them, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxyhectaethylene glycol mono(meth)acrylate, ethoxyoctaethylene glycol mono(meth)acrylate, ethoxynonaethylene glycol mono(meth)acrylate, ethoxydecaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxyhectapropylene glycol mono (meth)acrylate, ethoxyoctapropylene glycol mono(meth)acrylate, ethoxynonapropylene glycol mono(meth)acrylate, ethoxydecapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, ethoxyheptabutylene glycol mono(meth)acrylate, ethoxyhectabutylene glycol mono(meth)acrylate, ethoxyoctabutylene glycol mono(meth)acrylate, ethoxynonabutylene glycol mono(meth)acrylate, and ethoxydecabutylene glycol mono(meth)acrylate are preferred. These may be used singly or in mixture of two or more kinds thereof.

The content of the component (C) is not particularly limited, and is preferably in the range of 10 to 80 parts by mass, more preferably 20 to 70 parts by mass, still more preferably 25 to 60 parts by mass, and particularly preferably in the range of 30 to 50 parts by mass relative to 100 parts by mass of a total of the component (B) and the component (C). By having the content of the component (B) within the above range, it is possible to obtain a photocurable resin composition from which a cured product can be obtained more quickly by photocuring, and a cured product having a low reaction force in a wide range of compressibility (compression range) can be obtained.

The content (total) of the component (B) and the component (C) is not particularly limited, but is preferably 30 to 90 parts by mass, more preferably 40 to 80 parts by mass, and particularly preferably 50 to 70 parts by mass relative to 100 parts by mass of the total mass of the photocurable resin composition.

One kind of the monofunctional (meth)acrylate monomer as the component (C) may be used singly, or two or more kinds thereof may be used in combination. When two or more kinds are used in combination, the content of the component (C) refers to the total amount.

<Component (D)>

The photocurable resin composition according to the present invention preferably contains a photo-radical polymerization initiator as a component (D). As the component (D), a compound that generates radical species by irradiation with active energy rays such as visible light, ultraviolet rays, and electron beams may be used. Examples of such a photo-radical polymerization initiator include an acetophenone-based photo-radical polymerization initiator, a benzoin-based photo-radical polymerization initiator, a benzophenone-based photo-radical polymerization initiator, a thioxanthone-based photo-radical polymerization initiator, an acylphosphine oxide-based photo-radical polymerization initiator, a titanocene-based photo-radical polymerization initiator, and the like. Among these, the component (D) is preferably an acetophenone-based photo-radical polymerization initiator and/or an acylphosphine oxide-based photo-radical polymerization initiator, and is more preferably an acetophenone-based photo-radical polymerization initiator because a photocurable resin composition having a high curing rate can be obtained even when the integrated amount of light is small. These may be used singly or in mixture of two or more kinds thereof.

Examples of the acetophenone-based photo-radical polymerization initiator include diethoxyacetophenone, 2-hydroxy-2-methyl-1-phenyl-propane-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propane-1-one, 2-benzyl-2-dimethylamino-1-(4-morpholinophenyl)butanone, 2-hydroxy-2-methyl-1-[4-(1-methylvinyl)phenyl]

propanone oligomer, and the like, but are not limited thereto. Examples of commercially available products of the acetophenone-based photo-radical polymerization initiator include Omnirad (registered trademark, the same applies hereinafter) 184, Omnirad 1173, Omnirad 2959, Omnirad 127 (manufactured by IGM Resins B.V.), and ESACURE (registered trademark) KIP-150 (manufactured by IGM Resins B.V.).

Examples of the acylphosphine oxide-based photo-radical polymerization initiator include bis(2,4,6-trimethylbenzoyl)-phenyl-phosphine oxide, 2,4,6-trimethylbenzoyl-diphenyl-phosphine oxide, and the like, but are not limited thereto. Examples of commercially available products of the acylphosphine oxide-based photo-radical polymerization initiator include Omnirad TPO, Omnirad 819, and Omnirad 819DW (manufactured by IGM Resins B.V.).

The content of the component (D) is not particularly limited, and is preferably 0.1 to 15 parts by mass, more preferably 0.3 to 7.0 parts by mass, particularly preferably in the range of 0.5 to 5.0 parts by mass, and most preferably 1.0 to 3.0 parts by mass relative to 100 parts by mass of a total of the component (B) and the component (C). By having the content of the component (D) within the above range, it is possible to obtain a photocurable resin composition from which a cured product having a low reaction force in an even wider range of compressibility (compression range) can be obtained.

One kind of the photo-radical polymerization initiator as the component (D) may be used singly, or two or more kinds thereof may be used in combination. When two or more kinds are used in combination, the content of the component (D) refers to the total amount.

<Component (E)>

The photocurable resin composition according to the present invention preferably contains, as a component (E), a plasticizer having no (meth)acryloyl group. By using a plasticizer having no (meth)acryloyl group, an effect that the reaction force generated in the obtained cured product becomes small in a wide range of compressibility (compression range) can be obtained. By combining the component (E) with the component (A), it is possible to obtain a photocurable resin composition from which a cured product can be obtained quickly by photocuring and a cured product having a low reaction force in a wide range of compressibility (compression range) can be obtained.

The plasticizer as the component (E) preferably has a polyether skeleton in order to improve desired effects. The definition of "polyether skeleton" is as described in the section of the component (B). The number of carbon atoms constituting the alkylene oxide is not particularly limited, and the number of carbon atoms in one repeating unit is preferably 2 to 10, more preferably 2 to 5, particularly preferably 2 to 4, and most preferably 3. That is, the polyether skeleton contained in the component (E) is preferably a polypropylene oxide skeleton.

The number of repeating units of the alkylene oxide constituting the polyether skeleton is not particularly limited, and is, for example, 3 to 300, more preferably 5 to 100, particularly preferably 10 to 60, and most preferably 20 to 50.

The number average molecular weight of the component (E) is not particularly limited, and is, for example, 200 to 30,000 g/mol, preferably 350 to 10,000 g/mol, particularly preferably 500 to 5,000 g/mol, and most preferably 1,000 to 3,000 g/mol. In the present specification, unless otherwise specified, a value calculated by a standard polystyrene conversion method using size exclusion chromatography (SEC) is adopted as the number average molecular weight. By having the number average molecular weight of the component (E) within the above range, it is possible to obtain a photocurable resin composition from which a cured product can be obtained more quickly by photocuring, and a cured product having a low reaction force in a wide range of compressibility (compression range) can be obtained.

Examples of the plasticizer that may be used as the component (E) include polyols, condensates thereof, and the like, and examples thereof include glycerin, diglycerin, triglycerin, ethylene glycol, propylene glycol, polyethylene glycol, and the like.

As the plasticizer as the component (E), either a synthetic product or a commercially available product may be used. The commercially available product of the component (E) is not particularly limited, and examples thereof include PEG #300, PEG #400, PEG #600, PEG #1000, PEG #1500, PEG #15400, PEG #2000, PEG #4000, PEG #6000, PEG #1100, PEG #2000, UNIOL (registered trademark) D-700, D-1000, D-1200, D-2000, D-4000, PB-500, PB-700, PB-1000, PB-2000 (manufactured by NOF CORPORATION), and the like.

The content of the component (E) is not particularly limited, and is preferably 20 to 200 parts by mass, more preferably 25 to 150 parts by mass, particularly preferably in the range of 30 to 100 parts by mass, and most preferably 35 to 70 parts by mass relative to 100 parts by mass of a total of the component (B) and the component (C). By having the content of the component (B) within the above range, it is possible to obtain a photocurable resin composition from which a cured product can be obtained more quickly by photocuring, and a cured product having a low reaction force in a wide range of compressibility (compression range) can be obtained.

One kind of the plasticizer as the component (E) may be used singly, or two or more kinds thereof may be used in combination. When two or more kinds are used in combination, the content of the component (E) refers to the total amount.

<Component (F)>

The photocurable resin composition according to the present invention preferably contains a bifunctional or higher polyfunctional (meth)acrylic monomer as a component (F). By combining the component (F) with the component (A), it is possible to obtain a photocurable resin composition from which a cured product can be quickly obtained by photocuring, and a cured product having a low reaction force in a wide range of compressibility (compression range) can be obtained.

Here, the polyfunctional (meth)acrylic monomer is a compound having two or more (meth)acryloyl groups. The (meth)acryloyl group may be contained in the monomer as a form of a (meth)acryloyloxy group.

The number of (meth)acryloyl groups contained in the polyfunctional (meth)acrylic monomer as the component (F) is not particularly limited as long as it is two or more, and is preferably three or more (trifunctional or higher), more preferably four or more (tetrafunctional or higher), and particularly preferably five or more (pentafunctional or higher) because a photocurable resin composition having a high curing rate even when the integrated amount of light is small can be obtained. On the other hand, the upper limit of the number of (meth)acryloyl groups is not particularly limited, and is, for example, eight or less (octafunctional or lower). In addition, the (meth)acryloyl group contained in the component (F) is preferably an acryloyl group for the purpose of improving photocurability and making compression set of the resulting cured product small.

The polyfunctional (meth)acrylic monomer as the component (F) is preferably a polyfunctional (meth)acrylate monomer (that is, an ester compound having two or more (meth)acryloyloxy groups, a (meth)acrylic acid ester) in order to improve desired effects. The preferred number of (meth)acryloyl groups contained in the polyfunctional (meth)acrylate monomer is the same as described above.

The molecular weight of the component (F) is not particularly limited, and is preferably less than 1,000, and more preferably 600 or less from the viewpoint of improving the curability of the photocurable resin composition. From the viewpoint of being excellent in compatibility with the component (A), the molecular weight of the compound of the component (F) is preferably more than 200, and more preferably 300 or more.

On the other hand, from the viewpoint of photocurability, the component (F) is preferably a polyfunctional (meth)acrylic monomer having no hydroxyl group, more preferably a polyfunctional (meth)acrylate monomer having no hydroxyl group, and particularly preferably a polyfunctional acrylate monomer having no hydroxyl group.

The component (F) is not particularly limited, and examples thereof include tetrafunctional (meth)acrylate monomers such as ditrimethylolpropane tetra(meth)acrylate and pentaerythritol tetra(meth)acrylate; pentafunctional (meth)acrylate monomers such as dipentaerythritol monohydroxy penta(meth)acrylate and alkyl-modified dipentaerythritol penta(meth)acrylate; hexafunctional (meth)acrylate monomers such as dipentaerythritol hexa(meth)acrylate, and among them, dipentaerythritol monohydroxy penta(meth)acrylate, alkyl-modified dipentaerythritol penta(meth)acrylate, dipentaerythritol hexa(meth)acrylate, and the like are preferable. These monomers may be used singly or in mixture of two or more kinds thereof.

The content of the component (F) is not particularly limited, and is preferably in the range of 0.1 to 15 parts by mass, more preferably in the range of 0.2 to 5 parts by mass, and particularly preferably in the range of 0.3 to 3 parts by mass relative to 100 parts by mass of a total of the component (B) and the component (C). By having the content of the component (F) within the above range, it is possible to obtain a photocurable resin composition from which a cured product can be obtained more quickly by photocuring, and a cured product having a low reaction force in a wide range of compressibility (compression range) can be obtained.

One kind of the polyfunctional (meth)acrylic monomer as the component (F) may be used singly, or two or more kinds thereof may be used in combination. When two or more kinds are used in combination, the content of the component (F) refers to the total amount.

<Component (G)>

The photocurable resin composition according to the present invention preferably contains an inorganic filler as a component (G). The component (G) is not particularly limited, and examples thereof include glass, fumed silica, alumina, talc, mica, ceramics, silicone rubber powder, calcium carbonate, aluminum hydroxide, aluminum nitride, carbon powder, kaolin clay, dry clay mineral, dry diatomaceous earth, and the like. Among these, fumed silica and talc are preferable for the purpose of obtaining a photocurable resin composition from which a cured product having a low reaction force in a wide range of compressibility (compression range) can be obtained. These may be used singly or in mixture of two or more kinds thereof.

The fumed silica is preferably hydrophobized with at least one surface treatment agent selected from the group consisting of organochlorosilanes, dimethylsilicone, and hexamethyldisilazane for the purpose of obtaining a photocurable resin composition from which a cured product having a low reaction force in a wide range of compressibility (compression range) can be obtained. Specific examples of the silica include AEROSIL (registered trademark) R974, R972, R972V, R972CF, R805, R812, R812S, R816, R8200, RY200, RX200, RY200S, R202 (manufactured by NIPPON AEROSIL CO., LTD.), and the like. They may be used singly or in mixture of two or more kinds thereof.

The content of the component (G) is not particularly limited, and is preferably in the range of 0.01 to 100 parts by mass, more preferably 0.1 to 50 parts by mass, particularly preferably in the range of 0.5 to 20 parts by mass, and particularly preferably in the range of 3 to 10 parts by mass relative to 100 parts by mass of a total of the component (B) and the component (C). By having the content of the component (G) within the above range, it is possible to obtain a photocurable resin composition from which a cured product having a low reaction force in an even wider range of compressibility (compression range) can be obtained.

One kind of the inorganic filler as the component (G) may be used singly, or two or more kinds thereof may be used in combination. When two or more kinds are used in combination, the content of the component (G) refers to the total amount.

<Optional Component>

The photocurable resin composition according to the present invention may further contain, in a range without impairing the object of the present invention, an additive such as epoxy-modified (meth)acrylate oligomer (excluding monofunctional (meth)acrylate oligomers having an urethane bond); polyfunctional (bifunctional or higher) urethane-modified (meth)acrylate oligomer; various elastomers such as styrene-based copolymer; organic peroxide; polythiol; silane coupling agent such as silane compound having (meth)acrylic group; storage stabilizer; antioxidants; light stabilizer; rust inhibitor; solvent; pigment; dye; flame retardant; tackifier; and surfactant.

<Method for Producing Photocurable Resin>

The photocurable resin composition of the present invention may be produced by a conventionally known method. For example, the photocurable resin composition according to the present invention may be obtained by weighing predetermined amounts of the component (A) and other optional components and mixing them using a mixing means such as a planetary mixer. At this time, the production conditions are not particularly limited, and it is preferable to perform the production under a light-shield condition for the purpose of suppressing an increase in viscosity. The mixing conditions are not particularly limited either, and the mixing temperature is preferably 10 to 70° C., more preferably 20 to 50° C., and particularly preferably normal temperature (25° C.), and the mixing time is preferably 0.1 to 5 hours, more preferably 30 minutes to 3 hours, and particularly preferably around 60 minutes.

<Cured Product>

Another aspect of the present invention is a cured product obtained by curing the photocurable resin composition (a cured product of the photocurable resin composition). As described in detail below, the cured product is preferably obtained by irradiating the photocurable resin composition with light (for example, active energy rays such as ultraviolet rays and visible light) to cure the photocurable resin composition. More specifically, the cured product according to one embodiment of the present invention is preferably obtained by applying the photocurable resin composition to an adherend, and then irradiating the applied photocurable resin composition with light.

<Application Method>

The method for applying the photocurable resin composition according to the present invention to an adherend such as a substrate is not particularly limited, and a known method for applying an adhesive or a coating material may be used. For example, methods such as dispensing using an automatic coater, spraying, inkjet, screen printing, gravure printing, dipping, and spin coating may be used.

The thickness of the coating is not particularly limited, and is adjusted so that the film thickness after drying is 0.1 to 5 mm, and more preferably 0.5 to 3 mm.

<Curing Method>

The photocurable resin composition according to the present invention may be cured by irradiation with light (for example, active energy rays such as ultraviolet rays and visible light). The light herein means light in a broad sense including various active energy rays such as radiations such as α rays and β rays, electromagnetic waves such as γ rays and X rays, electron beams (EB), ultraviolet rays having a wavelength of about 100 to 400 nm, and visible rays having a wavelength of about 400 to 800 nm.

The light source used for curing the photocurable resin composition is not particularly limited, and examples thereof include a low-pressure mercury lamp, a medium-pressure mercury lamp, a high-pressure mercury lamp, an ultra-high pressure mercury lamp, a black light lamp, a microwave-excited mercury lamp, a metal halide lamp, a sodium lamp, a halogen lamp, a xenon lamp, an LED, a fluorescent lamp, sunlight, an electron beam irradiation device, and the like. As an apparatus for curing the photocurable resin composition according to the present invention by light irradiation (active energy ray irradiation), an irradiation apparatus having the light source (a high-pressure mercury lamp, an LED, or the like) may be used. Specific examples of the device include a conveyor belt type irradiator, a spot irradiator, and the like, but are not limited thereto. The lower limit of the integrated light amount is not particularly limited, and is preferably 0.5 kJ/m$^2$ or more, and more preferably 1.0 kJ/m$^2$ or more. Thus, the photocurable resin composition according to the present invention can be sufficiently cured even when the integrated light amount is small, and the properties of the resulting cured product are also excellent. The upper limit of the integrated light amount is not particularly limited either, and is preferably 50 kJ/m$^2$ or less, and more preferably 30 kJ/m$^2$ or less.

The reaction force at the time of compression of the cured product according to the present invention is 1 to 300 kPa at 10% compression and 1 to 500 kPa at 50% compression. In the present specification, the "reaction force at 10% compression" refers to a reaction force when the cured product is compressed to have a thickness of 90% with respect to the initial thickness of the cured product. Likewise, the "reaction force at 50% compression" refers to a reaction force when the cured product is compressed to have a thickness of 50% with respect to the initial thickness of the cured product. The method for measuring the reaction force specifically follows the method described in the following section <Reaction Force When Cured Product Is Compressed>.

The cured product of the photocurable resin composition according to the present invention has an advantage that the reaction force generated is small, in particular, when the cured product is compressed at a high compressibility. Specifically, the reaction force at 10% compression is preferably 2 to 250 kPa, more preferably 2 to 100 kPa, particularly preferably 2 to 50 kPa, and most preferably 2 to 10 kPa. The reaction force at 50% compression is preferably 2 to 400 kPa, more preferably 50 to 400 kPa, particularly preferably 110 to 400 kPa, and most preferably 120 to 380 kPa. Furthermore, both the reaction force at 10% compression and the reaction force at 50% compression are preferably within the range of any combination of the above ranges.

(Preferred Composition of Photocurable Resin Composition)

To obtain a cured product that generates the above-mentioned reaction force, the photocurable resin composition according to the present invention preferably has the following composition.

That is, the photocurable resin composition according to the present invention is a photocurable resin composition that does not contain a monofunctional (meth)acrylic monomer having a hydroxyl group and contains a hollow organic resin filler as the component (A), and preferably further contains the components (B) to (E). At this time, each of the component (B), the component (C), and the component (E) is preferably a compound containing a polyether skeleton. The polyether skeletons contained in the component (B), the component (C), and the component (E) may be the same as or different from each other. As for the preferred contents of the components (A) to (E) in the above embodiment, the ranges of the contents described in the explanation section regarding the respective components may be referred, and the preferred ranges may be selected and combined.

Further, to obtain a cured product that generates the above-mentioned reaction force, the photocurable resin composition according to the present invention is a photocurable resin composition that does not contain a monofunctional (meth)acrylic monomer having a hydroxyl group and contains a hollow organic resin filler as the component (A), and preferably further contains the components (B) to (F). At this time, the component (B), the component (C), and the component (F) preferably have an acryloyl group. With such a configuration, it is possible to obtain an effect that the photocurability of the resin composition improves and the compression set of the resulting cured product becomes small as compared with a case in which one or more of the component (B), the component (C), and the component (F) contain a compound having a methacryloyl group. In addition, as for the preferred contents of the components (A) to (F) in the above embodiment, the ranges of the contents described in the explanation section regarding the respective components may be referred, and the preferred ranges may be selected and combined.

Furthermore, to obtain a cured product that generates the above-mentioned reaction force, the photocurable resin composition according to the present invention preferably does not contain a monofunctional (meth)acrylic monomer having a hydroxyl group, and is preferably comprised of the above components (A) to (G). Note that "comprised of the above components (A) to (G)" means "substantially consisting of the above components (A) to (G)", and mixing of impurities of 1% by mass or less may be allowed. In addition, as for the preferred contents of the components (A) to (G) in the above embodiment, the ranges of the contents described in the explanation section regarding the respective components may be referred, and the preferred ranges may be selected and combined.

Furthermore, to obtain a cured product that generates the above-mentioned reaction force, the photocurable resin composition according to the present invention preferably does not contain a monofunctional (meth)acrylic monomer having a hydroxyl group and contains a hollow organic resin filler as the component (A), and the content of the compound having a hydroxyl group is preferably less than 7.6 parts by mass relative to 100 parts by mass of the total mass of the photocurable resin composition.

<Reaction Force When Cured Product is Compressed>

In the present specification, the reaction force of the cured product is measured by the following procedure.

The photocurable resin composition is sandwiched between two polyethylene terephthalate films for peeling, and formed into a film shape using a 1 mm-thick spacer. Next, ultraviolet rays (wavelength: 365 nm) are irradiated with an ultraviolet irradiation device such that the integrated light amount is 15 kJ/m$^2$ to cure the photocurable resin composition between the films, and then a product from which the polyethylene terephthalate films for peeling are removed (that is, a cured product) is obtained. A sample (disc having a thickness of 1 mm and a diameter of 35 mm) is prepared from the cured product. Next, with a tensile compression device (manufactured by Shimadzu Corporation; model number AGX-50 kNV), a stress (unit: kPa) applied to the sensor from the test piece (sample) when the sample was compressed at 10% (that is, the sample was compressed to have a thickness of 0.9 mm) or at 50% (that is, the sample was compressed to have a thickness of 0.5 mm) with respect to the sample thickness of 1 mm, at a test compression rate of 50 mm/min in an atmosphere of 25° C. is measured as the reaction force. The reaction force of the cured product of the sample is measured in accordance with JIS K 7181:2011.

In the present invention, the reaction force of the cured product at 10% compression is preferably 1 to 300 kPa, and more preferably 2 to 250 kPa. The reaction force of the cured product at 50% compression is preferably 1 to 500 kPa, and more preferably 2 to 400 kPa. By having the reaction force within the above range, the reaction force generated in the cured product becomes small, and thus, when the cured product of the photocurable resin composition according to the present invention is sandwiched between battery cells as a cushioning material, deformation of the case surface of the battery pack can be effectively suppressed.

[Laminated Body]

Another aspect of the present invention is a laminated body obtained by using and laminating the photocurable resin composition. Specifically, the laminated body according to one embodiment of the present invention is a laminated body including a first adherend, a second adherend, and the cured product, and having a configuration in which the first adherend and the second adherend are bonded to each other with the cured product interposed therebetween. That is, the laminated body according to one embodiment of the present invention is a laminated body in which a first adherend, a cured product of the photocurable resin composition, and a second adherend are laminated in this order.

Materials constituting the first adherend and the second adherend are not particularly limited, and for example, materials used in the field described in the section of [Use Application] described later may be applied.

The method for producing the laminated body is not particularly limited, and examples thereof include a method of applying the photocurable resin composition according to the present invention over the first adherend, then disposing the second adherend over the applied resin composition, and then irradiating the applied resin composition with light.

[Use Application]

The photocurable resin composition according to the present invention may be used in various fields such as an automobile field, an electrical and electronic component field, and an aerospace field. Among them, because a cured product having a low reaction force in a wide range of compressibility (compression range) can be obtained, examples of particularly preferable use application include a resin for bonding a liquid crystal display unit and a protective panel; a fuel cell; sealing of a sensor; an elastic curable resin for adjusting a surface pressure applied in a stacking direction between cells in a stack of a secondary battery cells (for example, see JP 2009-158381 A); and the like.

Although embodiments of the present invention have been described in detail, it is clearly understood that the same is by way of illustration and example only and not limitation, the scope of the present invention should be interpreted by terms of the appended claims.

The present invention encompasses the following aspects and embodiments.

[1] A photocurable resin composition, wherein a reaction force at 10% compression of a cured product is 1 to 300 kPa and a reaction force at 50% compression of the cured product is 1 to 500 kPa, and
wherein the photocurable resin composition includes a hollow organic resin filler as a component (A) and does not include a monofunctional (meth)acrylic monomer having a hydroxyl group.

[2] The photocurable resin composition according to [1], further containing components (B) to (D) below:
component (B): a monofunctional urethane (meth)acrylate
component (C): a monofunctional (meth)acrylic monomer other than the component (B), and
component (D): a photo-radical polymerization initiator.

[3] The photocurable resin composition according to [2], containing 3 to 70 parts by mass of the component (A) relative to 100 parts by mass of a total of the component (B) and the component (C).

[4] The photocurable resin composition according to [2] or [3], wherein a weight average molecular weight of the component (B) is 1,000 to 300,000 g/mol.

[5] The photocurable resin composition according to any one of [1] to [4], further containing a plasticizer having no (meth)acryloyl group as a component (E).

[6] The photocurable resin composition according to [5], wherein each of the component (B), the component (C), and the component (E) is a compound containing a polyether skeleton.

[7] The photocurable resin composition according to any one of [1] to [6], wherein an average particle diameter of the component (A) is 5 to 300 μm.

[8] The photocurable resin composition according to any one of [1] to [7], wherein the organic resin of the component (A) is comprised of an acrylonitrile-methacrylonitrile-methyl methacrylate copolymer.

[9] The photocurable resin composition according to any one of [1] to [8], further containing a bifunctional or higher polyfunctional (meth)acrylic monomer as a component (F).

[10] A cured product of the photocurable resin composition according to any one of [1] to [9].

[11] A laminated body including: a first adherend; a second adherend; and the cured product according to [10], wherein the laminated body has a configuration in which the first adherend and the second adherend are bonded to each other with the cured product interposed therebetween.

The present invention also encompasses the following aspect.

[1'] A photocurable resin composition which includes a hollow organic resin filler as a component (A) and does not include a monofunctional (meth)acrylic monomer having a hydroxyl group,
wherein a cured product of the photocurable resin composition has a reaction force at 10% compression of 1 to 300 kPa and a reaction force at 50% compression of 1 to 500 kPa.

Furthermore, in the aspect of the above [1'], the present invention may take the forms of the above [2] to [11].

EXAMPLES

Hereinafter, the present invention will be described in more detail with reference to Examples, but the present invention is not limited only to these Examples. Operation, test, and the like were performed under an environment of 25° C. and 55% RH unless otherwise specified.
<Preparation of Photocurable Resin Composition>

Example 1

The following components (A) to (G) were weighed and mixed using a mixer at 25° C. for 60 minutes in a light-shielded environment to obtain a photocurable resin composition in a liquid state at 25° C. (Example 1);
As the component (A), component (a1): a hollow filler (microsphere) comprised of an acrylonitrile-methacrylonitrile-methyl methacrylate copolymer having an average particle diameter of 80 μm and a true specific gravity 0.13 g/cm$^3$ with calcium carbonate adhered to the surface (manufactured by Nippon Fillite Co., Ltd.; EMC-80B), 20 parts by mass
As the component (B), component (b1): monofunctional polyether-based urethane acrylate having a weight average molecular weight of 30,000 (manufactured by Negami Chemical Industrial Co., Ltd.), 80 parts by mass
As the component (C), component (c1): ethoxydiethylene glycol monoacrylate (manufactured by Toyo Chemicals Co., Ltd.; Miramer (registered trademark) M170; molecular weight 188), 35 parts by mass
As the component (D), component (d1): 2-hydroxy-2-methyl-1-phenyl-propane-1-one (manufactured by DOUBLE BOND CHEMICAL IND. CO., LTD.; DOUBLECURE (registered trademark) 173) 3 parts by mass
As the component (E), component (e1): a polypropylene glycol having a number average molecular weight of 2,000 and a repeating number of alkylene oxide 34 (manufactured by NOF CORPORATION; UNIOL (registered trademark) D2000), 44 parts by mass
As the component (F), component (f1): dipentaerythritol hexaacrylate (manufactured by DAICEL-ALLNEX LTD.; DPHA; molecular weight 579), 1.6 parts by mass
As the component (G), component (g1): silica particles surface-treated with dimethyl silicone (fumed silica), 7 parts by mass.

Example 2

A photocurable resin composition in a liquid state at 25° C. (Example 2) was obtained in the same manner as in Example 1 except that the content of the component (a1) was changed from 20 parts by mass to 25 parts by mass in Example 1.

Example 3

A photocurable resin composition in a liquid state at 25° C. (Example 3) was obtained in the same manner as in Example 2 except that a component (a2): a hollow filler (microsphere) comprised of an acrylonitrile-methacrylonitrile-methyl methacrylate copolymer having an average particle diameter of 120 μm and a true specific gravity of 0.10 g/cm$^3$ with calcium carbonate adhered to the surface (manufactured by Nippon Fillite Co., Ltd.; 120α) was added instead of the component (a1) in Example 2.

Example 4

A photocurable resin composition in a liquid state at 25° C. (Example 4) was obtained in the same manner as in Example 3 except that the component (b1) 80 parts by mass was changed to a component (b2): monofunctional polyether-based urethane acrylate having a weight average molecular weight of 20,000 (manufactured by Negami Chemical Industrial Co., Ltd.), 70 parts by mass, and the content of the component (e1) was changed from 44 parts by mass to 60 parts by mass in Example 3.

Example 5

A photocurable resin composition in a liquid state at 25° C. (Example 5) was obtained in the same manner as in Example 4 except that the content of the component (f1) was changed from 1.6 parts by mass to 3.2 parts by mass in Example 4.

Comparative Example 1

A photocurable resin composition in a liquid state at 25° C. (Comparative Example 1) was obtained in the same manner as in Example 1 except that the component (a1) was not added in Example 1.

Comparative Example 2

A photocurable resin composition in a liquid state at 25° C. (Comparative Example 2) was obtained in the same manner as in Example 1 except that the component (a1) was changed to a component (a'1): a glass hollow filler having an average particle diameter of 65 μm and a true specific gravity of 0.13 g/cm$^3$ (manufactured by 3M; Glass Bubbles K1) in Example 1.

Comparative Example 3

A photocurable resin composition in a liquid state at 25° C. (Comparative Example 3) was obtained in the same manner as in Example 4 except that the component (c1) was changed to a component (c'1): 2-hydroxyethyl acrylate (manufactured by OSAKA ORGANIC CHEMICAL INDUSTRY LTD.) in Example 4.

Comparative Example 4

A photocurable resin composition in a liquid state at 25° C. (Comparative Example 4) was obtained in the same manner as in Example 4 except that the content of the component (c1) was changed from 35 parts by mass to 15 parts by mass, and further, the component (c'1) was contained in an amount of 15 parts by mass in Example 4.

The contained components and contents thereof in each photocurable resin composition according to Examples and Comparative Examples are shown in Table 1 below. The blanks indicate that the corresponding component is not added.

integrated light amount of 1.5 kJ/m² were irradiated, whereby a test piece was obtained. Next, the test piece was brought into contact with a glass rod having a sharp tip, and curability of each photocurable resin composition was evaluated based on the following criteria;

[Evaluation Criteria]

○: There is no attached substance on the rod.

x: There is an attached substance on the rod.

TABLE 1

|  |  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Component (A) | (a1) | 20 | 25 |  |  |  |  |  |  |  |
|  | (a2) |  |  | 25 | 25 | 25 |  |  | 25 | 25 |
|  | (a'1) |  |  |  |  |  |  | 20 |  |  |
| Component (B) | (b1) | 80 | 80 | 80 |  |  | 80 | 80 |  |  |
|  | (b2) |  |  |  | 70 | 70 |  |  | 70 | 70 |
| Component (C) | (c1) | 35 | 35 | 35 | 35 | 35 | 35 | 35 |  | 15 |
|  | (c'1) |  |  |  |  |  |  |  | 35 | 15 |
| Component (D) | (d1) | 3 | 3 | 3 | 3 | 3 | 3 | 3 | 3 | 3 |
| Component (E) | (e1) | 44 | 44 | 44 | 60 | 60 | 44 | 44 | 60 | 60 |
| Component (F) | (f1) | 1.6 | 1.6 | 1.6 | 1.6 | 3.2 | 1.6 | 1.6 | 1.6 | 1.6 |
| Component (G) | (g1) | 7 | 7 | 7 | 7 | 7 | 7 | 7 | 7 | 7 |
| Reaction force when compressed/ 10% compression (kPa) |  | 8 | 3 | 5 | 3 | 5 | 3 | 13 | Uncured | Uncured |
| Reaction force when compressed/ 50% compression (kPa) |  | 370 | 127 | 170 | 166 | 158 | 1142 | 791 | Uncured | Uncured |
| Photocurability |  | ○ | ○ | ○ | ○ | ○ | ○ | ○ | x | x |

The photocurable resin compositions according to the above Examples and Comparative Examples were subjected to the following tests (1) and (2). The test methods of the tests (1) and (2) are as follows.

<Test (1): Reaction Force When Cured Product is Compressed>

Each photocurable resin composition was sandwiched between two polyethylene terephthalate films for peeling, and formed into a film shape using a 1 mm-thick spacer. Next, ultraviolet rays (wavelength: 365 nm) were irradiated with an ultraviolet irradiation device such that the integrated light amount was 15 kJ/m² to cure the photocurable resin composition between the films, and then a product from which the polyethylene terephthalate films for peeling were removed (that is, a cured product) was obtained. A disk having a thickness of 1 mm and a diameter of 35 mm was cut out from the cured product and used as a sample. Next, with a compression device (manufactured by Shimadzu Corporation; model number AGX-50 kNV), a reaction force (unit: kPa) applied to the sensor when the sample was compressed at 10% (that is, the sample was compressed to have a thickness of 0.9 mm) or at 50% (that is, the sample was compressed to have a thickness of 0.5 mm) with respect to the sample thickness of 1 mm, at a test compression speed of 50 mm/min in an atmosphere of 25° C. was measured. The reaction force of the cured product of each sample was measured in accordance with JIS K 7181:2011. The obtained results are shown in Table 1. The term "Uncured" in the tables means that the material remained in a liquid state even though the material was irradiated with ultraviolet rays.

<Test (2): Photocurability Test>

Each photocurable resin composition in an amount of 0.01 g was dropped on a glass test piece having a width of 25 mm×a length of 100 mm×a thickness of 5 mm. Thereafter, with an ultraviolet irradiator (conveyor UV irradiation device; light source LED; UV wavelength 365 nm; peak illuminance 650 mW/cm²), active energy rays with an As shown in Table 1, it was confirmed that a cured product was able to be obtained quickly by photocuring, and a cured product having a low reaction force in a wide range of compressibility (compression range) was able to be obtained by using the photocurable resin composition according to Example 1 to 5.

On the other hand, Comparative Example 1 is a photocurable resin composition that does not contain the component (A) in the present invention, and a result that the reaction force at 50% compression of the cured product was too high was obtained. Comparative Example 2 is a photocurable resin composition containing the component (a'1) which is a glass hollow filler instead of the component (A) in the present invention, and a result that the reaction force at 50% compression of the cured product was too high was obtained. Furthermore, Comparative Examples 3 and 4 are photocurable resin compositions containing the component (c'1) which is a monofunctional acrylic monomer having a hydroxyl group, and results that the photocurability is remarkably poor were obtained.

INDUSTRIAL APPLICABILITY

Because the photocurable resin composition according to the present invention provides a cured product having a low reaction force in a wide range of compressibility (compression range), it can be used in various fields and is industrially useful. In addition, because the photocurable resin composition according to the present invention does not only provide a cured product quickly by photocuring, but also is in a liquid state (liquid) before curing, surface coating, screen printing, or the like can be selected when obtaining a cured product, and this can contribute to improvement of productivity.

What is claimed is:

1. A photocurable resin composition, wherein
a reaction force at 10% compression of a cured product is 1 to 300 kPa,
a reaction force at 50% compression of the cured product is 1 to 500 kPa, and
wherein the photocurable resin composition does not include a monofunctional (meth)acrylic monomer having a hydroxyl group, and
the photocurable resin composition consists of components (A) to (D) below, and optionally at least one selected from the group consisting of components (E) to (G) below:
component (A): a hollow organic resin filler,
component (B): a monofunctional urethane (meth)acrylate,
component (C): a monofunctional (meth)acrylic monomer other than the component (B),
component (D): a photo-radical polymerization initiator,
component (E): a plasticizer having no (meth)acryloyl group,
component (F): a bifunctional or higher polyfunctional (meth)acrylic monomer, and
component (G): an inorganic filler,
a true specific gravity of the hollow organic resin filler is 0.07 to 0.30 g/cm$^3$, and
the monofunctional (meth)acrylic monomer is at least one selected from the group consisting of methoxydiethylene glycol mono(meth)acrylate, methoxytriethylene glycol mono(meth)acrylate, methoxytetraethylene glycol mono(meth)acrylate, methoxypentaethylene glycol mono(meth)acrylate, methoxyhexaethylene glycol mono(meth)acrylate, methoxyheptaethylene glycol mono(meth)acrylate, methoxytripropylene glycol mono(meth)acrylate, methoxytetrapropylene glycol mono(meth)acrylate, methoxypentapropylene glycol mono(meth)acrylate, methoxyhexapropylene glycol mono(meth)acrylate, methoxyheptapropylene glycol mono(meth)acrylate, methoxytributylene glycol mono(meth)acrylate, methoxytetrabutylene glycol mono(meth)acrylate, methoxypentabutylene glycol mono(meth)acrylate, methoxyhexabutylene glycol mono(meth)acrylate, methoxyheptabutylene glycol mono(meth)acrylate, ethoxydiethylene glycol mono(meth)acrylate, ethoxytriethylene glycol mono(meth)acrylate, ethoxytetraethylene glycol mono(meth)acrylate, ethoxypentaethylene glycol mono(meth)acrylate, ethoxyhexaethylene glycol mono(meth)acrylate, ethoxyheptaethylene glycol mono(meth)acrylate, ethoxytripropylene glycol mono(meth)acrylate, ethoxytetrapropylene glycol mono(meth)acrylate, ethoxypentapropylene glycol mono(meth)acrylate, ethoxyhexapropylene glycol mono(meth)acrylate, ethoxyheptapropylene glycol mono(meth)acrylate, ethoxytributylene glycol mono(meth)acrylate, ethoxytetrabutylene glycol mono(meth)acrylate, ethoxypentabutylene glycol mono(meth)acrylate, ethoxyhexabutylene glycol mono(meth)acrylate, and ethoxyheptabutylene glycol mono(meth)acrylate.

2. The photocurable resin composition according to claim 1, wherein
the inorganic filler is at least one selected from the group consisting of glass, fumed silica, alumina, talc, mica, ceramics, silicone rubber powder, calcium carbonate, aluminum hydroxide, aluminum nitride, carbon powder, kaolin clay, dry clay mineral, and dry diatomaceous earth.

3. The photocurable resin composition according to claim 1, comprising 3 to 70 parts by mass of the component (A) relative to 100 parts by mass of a total of the component (B) and the component (C).

4. The photocurable resin composition according to claim 1, wherein a weight average molecular weight of the component (B) is 1,000 to 300,000 g/mol.

5. The photocurable resin composition according to claim 1, wherein each of the component (B) and the component (E) is a compound containing a polyether skeleton.

6. The photocurable resin composition according to claim 1, wherein an average particle diameter of the component (A) is 5 to 300 μm.

7. The photocurable resin composition according to claim 1, wherein the organic resin of the component (A) is comprised of an acrylonitrile-methacrylonitrile-methyl methacrylate copolymer.

8. A cured product of the photocurable resin composition set forth in claim 1.

9. A laminated body comprising: a first adherend; a second adherend; and the cured product set forth in claim 8, wherein the laminated body has a configuration in which the first adherend and the second adherend are bonded to each other with the cured product interposed therebetween.

10. The photocurable resin composition according to claim 1, wherein a molecular weight of the component (F) is more than 200 and less than 1,000.

11. The photocurable resin composition according to claim 1, wherein the component (F) is a polyfunctional (meth)acrylate monomer having no hydroxyl group.

12. The photocurable resin composition according to claim 1, wherein the component (E) has a polypropylene oxide skeleton.

13. The photocurable resin composition according to claim 1, comprising 0.1 to 15 parts by mass of the component (F) relative to 100 parts by mass of a total of the component (B) and the component (C).

14. The photocurable resin composition according to claim 1, comprising 0.01 to 100 parts by mass of the component (G) relative to 100 parts by mass of a total of the component (B) and the component (C).

15. The photocurable resin composition according to claim 1, comprising 20 to 70 parts by mass of the component (A) relative to 100 parts by mass of a total of the component (B) and the component (C).

16. The photocurable resin composition according to claim 1, wherein an average particle diameter of the component (A) is 5 to 100 μm.

17. The photocurable resin composition according to claim 1, wherein the component (A) is a hollow resin filler in which calcium carbonate is adhered to its surface.

18. The photocurable resin composition according to claim 1, wherein the component (C) is at least one selected from ethoxydiethylene glycol mono(meth)acrylate.

* * * * *